United States Patent [19]

May et al.

[11] 3,772,458

[45] Nov. 13, 1973

[54] METHOD FOR REDUCING THE BANDWIDTH OF COMMUNICATION SIGNALS

[75] Inventors: Franz May, Ulm/Donau; Broder Wendland, Ay/Iller, both of Germany

[73] Assignee: Licentia Patent-Verwaltungs-GmbH, Frankfurt am Main, Germany

[22] Filed: Sept. 15, 1971

[21] Appl. No.: 180,751

[30] Foreign Application Priority Data

Sept. 15, 1970 Germany .................. P 20 45 392.3
Sept. 24, 1970 Germany .................. P 20 46 974.3

[52] U.S. Cl. ............... 178/6, 178/DIG. 3, 325/38 B
[51] Int. Cl. .............................................. H03n 7/12
[58] Field of Search ........................ 325/38 R, 38 B; 178/DIG. 3; 179/15 BW, 15 BV

[56] References Cited

UNITED STATES PATENTS

| | | | |
|---|---|---|---|
| 3,715,722 | 2/1973 | Hall | 178/DIG. 3 |
| 3,324,237 | 6/1967 | Cherry et al. | 178/DIG. 3 |
| 3,393,364 | 7/1968 | Fine | 179/15 BV |
| 3,610,819 | 10/1971 | Thompson | 178/DIG. 3 |
| 3,071,727 | 1/1963 | Kitsopoulos | 178/DIG. 3 |
| 2,905,756 | 9/1959 | Graham | 178/DIG. 3 |
| 3,603,725 | 9/1971 | Cutler | 325/38 B |

*Primary Examiner*—Robert L. Griffin
*Assistant Examiner*—Joseph A. Orsino, Jr.
*Attorney*—George H. Spencer et al.

[57] ABSTRACT

Method of reducing the bandwidth of communication signals to suppress data signals considered insignificant as being only slightly different from preceding signals, and transmitting a constant quantity of data each time interval. The significant or relative data signal values are selected out of the input data signals by transforming the input data input signal,e.g.by forming the difference between successive or adjacent scanning values, determining the frequency distribution of the amplitudes of the transformed signal within a given time interval to provide a control signal whose value depends on the frequency distribution and comparing the control signal with the input data signal, which has been delayed by the given time interval, to provide an output signal whenever the control signal is exceeded.

10 Claims, 14 Drawing Figures

METHOD FOR REDUCING THE BANDWIDTH OF COMMUNICATION SIGNALS

BACKGROUND OF THE INVENTION

The present invention relates to a method for reducing the bandwidth of communication signals coming from a source whose source signal is strongly correlated and whose information content fluctuates in its magnitude, which method contains a redundancy reducing transformation and an adaptive information reduction for the purpose of adaptation to the limited bandwidth of a transmission channel.

The method according to the present invention can generally be used for any source whose data flow is strongly correlated and whose signal can be converted by a linear transformation in such a manner that the plurality of the scanned values is disappearingly small. It is particularly suited for processing television signals.

Previously known systems, such as predictors, interpolators, difference transmission, orthogonal transformations etc. were designed for the average amount of data flow. In such systems, if temporarily higher or lower data flows occur, a buffer store must take care of the uniform emission of the data flow. The store capacity required for this purpose in practice, however, is usually untenable. Short buffer stores which can be realized have the drawback, however, that at a high data flow a portion of the information generally gets lost; if the data flow is low the channel is not optimally utilized.

SUMMARY OF THE INVENTION

The method here proposed eliminates these drawbacks since it not only continuously reduces the redundancy present in the source but also keeps constant the quantity of data transmitted per unit time, in that the reduction is controlled in dependence on the information content with the aim of obtaining a constant quantity of data per unit time. The control is effected in such a manner that initially a control signal is derived in a given time interval appropriate for the source employed and based on a relevancy criterion dependent on the data sink, which control signal then controls the selection of relevant sample values from the suitably delayed and possibly converted source signal of the same time interval in such a manner that insignificant portions of the data signals, particularly signals which are only slightly different from the preceding signals, are suppressed so that the remainder of the data signals can be completely transmitted by the transmission channel.

To accomplish this, the statistic of the source signals is determined, at time intervals which are selected to suit the source, to control the means for varying the source signal in such a manner that the transmitted information rate remains constant in that "insignificant" information is suppressed. A variable threshold may determine the points of major changes from the transformed source signal and these are then transmitted or, with digital processing, an additional quantization of the transformed signal is effected, the degree of reduction being such that the information rate remains constant.

The proposed method can be used for analog signals as well as for digital signals.

BRIEF DESCRIPTION OF THE DRAWINGS

The present invention will be explained in detail below with the aid of the drawings.

DESCRIPTION OF THE PREFERRED EMBODIMENTS

Figure 1:
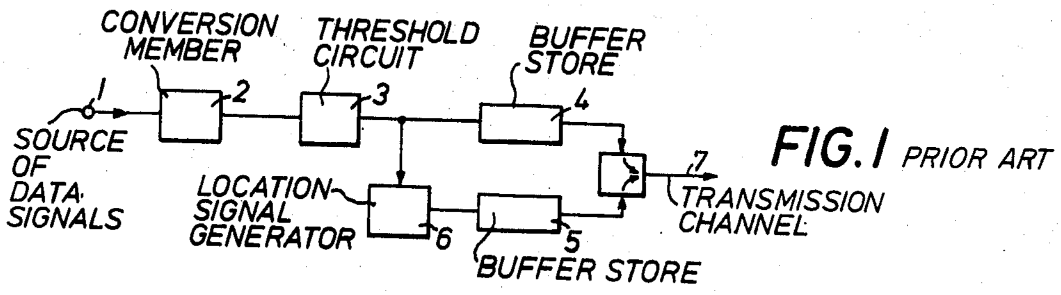
FIG. 1 PRIOR ART
FIG. 1 is a block diagram of prior art transmission circuitry.

Referring first to FIG. 1 there is shown a block circuit diagram of the previous unsatisfactory solution. The data signals originating from a source 1 are fed to a conversion member 2.

In the simplest case the conversion may be a difference formation. In this case only the difference of each data signal from another data signal, e.g. the immediately preceding signal, is transmitted. In this way a signal which is constant over long periods of time has the result that during the periods or times of constancy no information is being transmitted. Other possibilities of conversion are, for example, the optimum filtering or the use of a linear predictor. The above-mentioned methods all have in common that in cases where the source signals were strongly correlated, a high proportion of sample values become negligibly small so that a transmission of only those sample values which exceed a certain amplitude is sufficient. These values are determined by a threshold circuit 3 which constitutes a fixed threshold and can then be coded in such a manner that their values and their spacing from the subsequent values are transmitted (run length coding). The signal pairs arriving with variable timing must be stored in buffer stores 4 and 5 of relatively long length and must then be read out and transmitted at a constant transmission timing. This method does not optimally utilize the channel in practice when the buffer store is empty, and information losses occur when the buffer store is overflowing.

If it is assumed, as mentioned above, that the conversion by the conversion member 2 was a difference formation, the amplitude value of the difference must first be transmitted, and then also the time interval from the preceding signal. Since, as already mentioned, no information at all appears during the occurrence of constant periods within the data flow, but on the other hand, an equidistant sequence of sample values is given to the channel, buffer stores 4 are provided which are constructed, for example, as an analog shift register and which are interrogated in a timed pattern. The information about the spacing from the preceding signal will be called the "location signal." This location signal is determined by a location signal generator 6 and treated in the buffer store 5 in the same manner as the amplitude values in buffer store 4. The contents of both buffer stores are fed to the transmission channel 7.

In the illustrated case, the location signal may be determined in a simple manner in that a counter or integrator is started after each amplitude value coming from threshold circuit 3 and counts until the next significant amplitude value occurs. This count is a measure of the time interval of each amplitude value from its predecessor and can be used directly as the "location signal."

Figure 2:
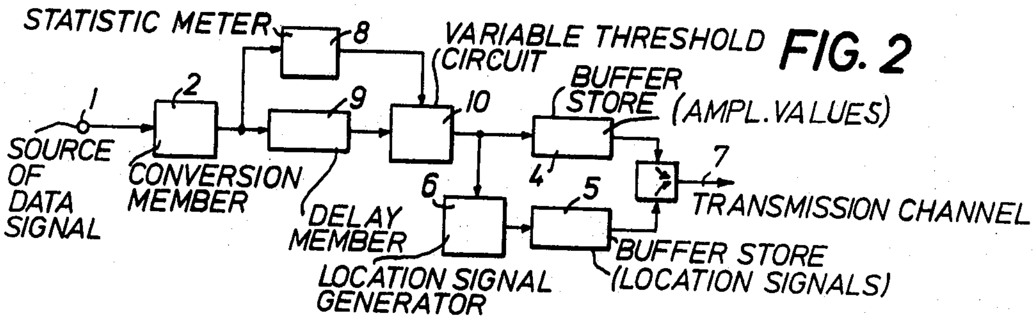
FIG. 2 is a block diagram of the transmission circuitry of the system of the present invention.
Figure 4:
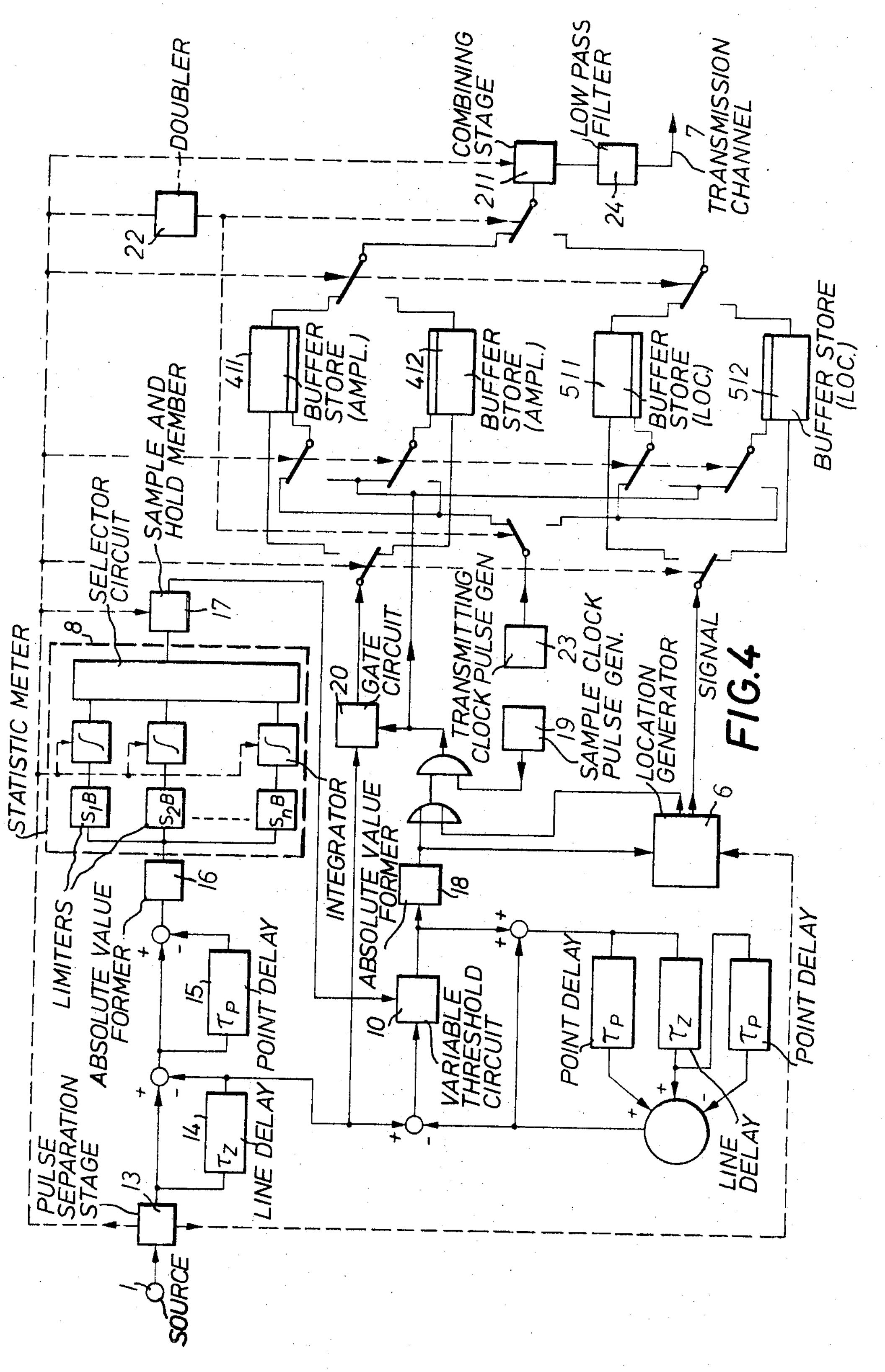
FIG. 4 is a more detailed block diagram of the transmission circuitry of FIG. 2 with the embodiment utilizing analog operation and transmission.

The method of the present invention will be roughly explained with the aid of the block circuit diagram of FIG. 2 in which the same components as in FIG. 1 bear the same reference numerals. Here again it will be assumed that the conversion is made in the form of a difference formation. New compared to the circuit diagram of FIG. 1 are the components represented by the statistic meter 8, delay member 9 and variable threshold 10. The significant additional measure is a measurement of the data flow after conversion during a given time interval by the statistic meter 8. The statistic meter 8 is, for example as shown in FIG. 4, provided in the form of a parallel connection of different threshold circuits with integrators connected thereto whose output voltages at the end of the time interval indicate the number of times the threshold has been exceeded at the respective threshold circuit. If now, because of the bandwidth of the selected channel, the number of transmittable scanning values per unit time is known, the threshold to be selected for the respective time interval results from the given integrator output voltage.

The selection of the time interval depends on the characteristics of the source and of the receiver. It results from the above that the statistic measurement requires a fixed time period, i.e. the duration of the above-mentioned time interval. The converted data signals are thus delayed in a delay member 9 by that amount of time.

In dependence of the result of the statistic measurement a variable threshold 10 is controlled. It is so adjusted that the number of scanning values transmitted per time interval remains constant. This number is equal to the number of positions in the connected buffer store 4 of amplitude values. If now a "quiet" data signal is present, i.e. a signal with but a few changes, a low value of the variable threshold 10 is set, while for a more strongly fluctuating data signal a higher threshold is set.

Figures 3, 5, 6:
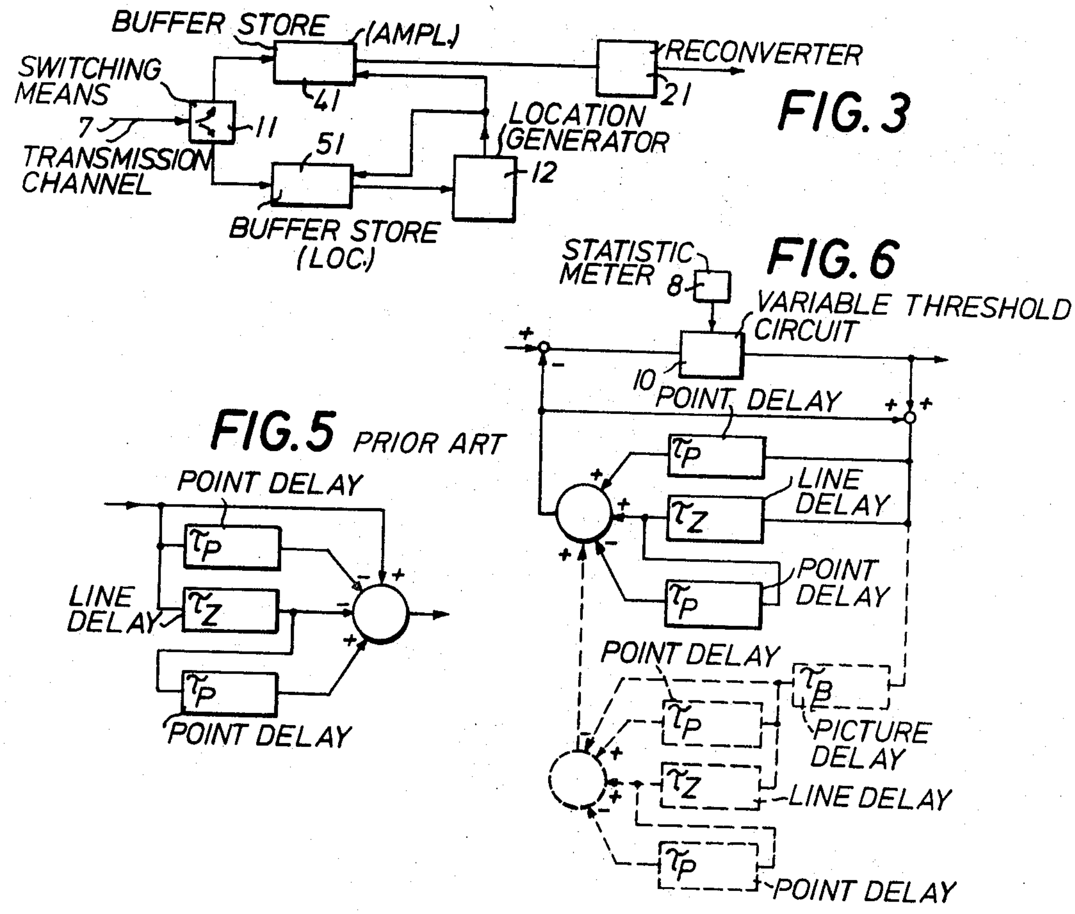
FIG. 3 FIG. 5 PRIOR ART FIG. 6
FIG. 3 is a block diagram of the receiver which may be used with either of the transmission systems of FIGS. 1 and 2.
FIG. 5 is a block diagram illustrating a variation of the circuitry for the delays 14 and 15 and connecting switching members of FIG. 4.
FIG. 6 is a block diagram illustrating a modification of a portion of the circuit of FIG. 4.

The reconstruction of the data in the receiver may be made for the method of the present invention in the same manner as for the conventional method as shown in the block diagram of FIG. 3. No additional signals need be transmitted.

At the receiver, by means of a switching member 11, the data signals from transmission channel 7 are distributed to two buffer stores 41 and 51, which are also analog shift registers, so that one buffer store (41) receives the amplitude values and the other buffer store (51) receives the location signals. It is now necessary to reconstruct the correct time spacing of the amplitude values from one another. This is done in a location generator 12 which is connected to buffer store 51. In the simplest case the location generator 12 is a counter which is set to the respective output value of the buffer store 51 and is then counted backward by the scanning clock pulses. Only after completion of the backward count will the respective new value be emitted from puffer stores 41 and 51. The output pulses of buffer store 41 which are thus no longer equidistant are fed to reconverter 21 which is inverse to conversion member 2 where they are made available for further evaluation.

The reconstructed data signal has a much higher quality than is obtainable in earlier systems since the channel is continuously utilized to its optimum.

One embodiment of the present invention will be explained in detail below with the aid of FIG. 4, this embodiment being based on a television transmission. The horizontal as well as the vertical correlation are here being utilized (two-dimensional case). If a correlation from picture to picture or frame to frame is also to be considered, the predictor must be appropriately enlarged (three-dimensional case). As shown by measurements of the receptivity of the human eye, the type of information reduction proposed here utilizes the physiological characteristics of the eye.

The embodiment of the invention is designed for analog operation and transmission but the method can also be used for pulse code modulation.

The arrangement represents a two or three dimensional linear predictor. The algorithm of the predictor is the two or three dimensional difference formation. This is accomplished according to the circuit of FIG. 5 which is known to result in an almost optimum prediction for the two dimensional picture. Details can be found, for example, in th paper by C. W. Harrison, entitled "Experiments with Linear Prediction in Television," Bell System Technical Journal, 1952.

The circuit according to FIG. 5 can be transformed in a known manner to that of FIG. 6 which shows the same behavior if the threshold is ≡ O. The circuit according to FIG. 6 is preferred since it prevents, for example for slowly rising gray wedges, an accumulation of the error caused by the threshold. Since with such gray wedges significant differences never occur because of the reference to the respective preceding information value due to the rise assumed to take place below the threshold response, a uniform area is transmitted instead of the gray wedge so that finally a substantial total error can result. The circuit according to FIG. 6 prevents this from occurring in that the information is not considered with respect to the respective preceding information value but with respect to the last significant information value. Application for the three dimensional case is shown in FIG. 6 in dashed lines.

The above-described measures are realized in the circuit according to FIG. 4. The data signals from source 1 are fed to a pulse separation stage 13 which produces the line synchronism. The line synchronizing signals appearing at the output of separation stage 13 are transmitted over the connection lines shown in dashed lines. After two delay members 14 and 15 have established a relationship with the information one line or one point ahead, the statistic meter 8 performs the measurement described in connection with FIG. 2. The series connection of members 14 and 15 is equivalent to the circuit of FIG. 5. An absolute value former 16, e.g. a full wave rectifier, is connected to the input of statistic meter 8 since the sign of the information is of no significance. The statistic meter 8 is constructed as described above of thresholds with limiters $S_1B$ to $S_nB$ and respective integrators connected thereto, and a selector circuit connected to the outputs of the integrators which operates according to the above-mentioned criteria. The output of the selector circuit, and hence of statistic meter 8, is connected to a sample and hold member 17 which maintains the value for the duration of one time interval and thus sets the variable threshold 10. The variable threshold 10 is connected with a switching member according to FIG. 6, and the output thereof is connected to an absolute valve former 18 which simultaneously performs a limiting function. The location signal generator 6 derives its input signal from the output value of the absolute value former 18. Based on the output values of location signal generator 6 and absolute value former 18 a gate circuit 20 is actuated by logic switching members which are switched with the aid of a sample clock pulse generator 19 the gate circuit 20 permitting the information to be transmitted or be blocked. Connected to the output of gate circuit 20 are buffer stores 411, 412 for the amplitude values and 511, 512 for the location signals. When the buffer stores are designed as analog shift registers, it is technically difficult to feed in values in an irregular sequence and to take out equidistant pulses (the timing being indicated). For this reason a pair of buffer stores are provided for each of the two types of information signals to be transmitted, which alternatingly receive and emit information based on the switches (which as indicated are controlled by the line sync pulses) connected ahead and behind the stores. The line sync pulses are returned to the outgoing information in the combining stage 211. In order to effect the correct switching frequency, a doubler 22 is provided. The transmitting clock pulse is furnished by a transmitting clock pulse generator 23. A lowpass filter 24 is connected between combining stage 211 and channel 7 which recovers the analog values from the equidistant pulses.

In the circuit according to FIG. 4 the average is formed, for example, over one line so that the delay line for the line difference formation can also be utilized for the delay of the data signal. However, it is also possible to form the averages over a shorter or longer time interval.

The location signal can be produced in a known manner in that a sawtooth generator is set to 0, whereby its output amplitude at the moment of the setting to zero represents a measure for the distance of the brightness value to be transmitted from the preceding one. In order to place no unrealistic requirements for the quality of the channel, a maximum length is given to the zero sequence. In an advantageous embodiment of the present invention the location of a brightness value is given with reference to a fixed time raster, the distance of the raster lines being greater than or equal to the maximum zero sequence. This has the result that an interference in an address does not adversely affect the entire remainder of the line and the required signal to noise ratio with respect to the conventional location coding is substantially reduced.

The pulse of the transmitting clock pulse generator 23 is shorter than the pulse of the sample clock pulse generator 19 by the bandwidth reduction factor of the arrangement. The bandwidth reduction factor is equal to one-half the ratio of the image points per line to the relevant image points per line.

Figure 7:
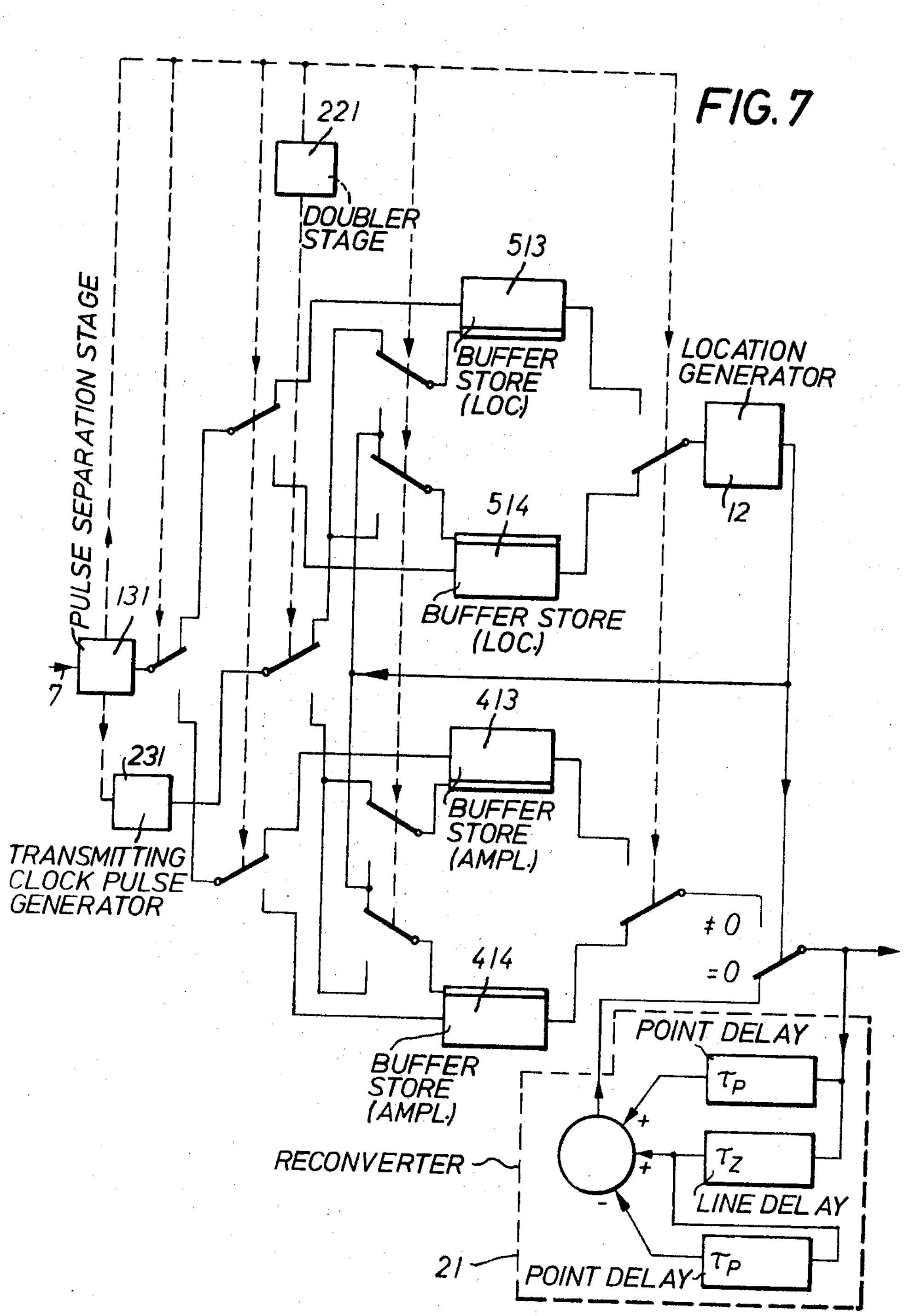
FIG. 7 is a more detailed block diagram of the FIG. 3 receiver.

The reconstruction in the receiver occurs as shown in the block circuit diagram of FIG. 7.

Inversely to the operation at the transmitting end, the equidistantly arriving signals are converted to location and brightness signals which are no longer equidistant.

The values coming from the transmission channel are separated from the line sync signals in a pulse separation stage 131 and are subsequently fed, via switches, to the buffer stores 413, 414 for the amplitude values and buffer stores 513 and 514 for the location signals. The switching is controlled with the aid of the line sync signals (indicated by the dashed lines) which are doubled, if required, in a doubler stage 221 and which otherwise also control a transmitting clock pulse generator 231. The function of the circuit otherwise corresponds to that of FIG. 3.

If a location signal is present, the difference formation in the transmitter did not produce a zero and the new scanning value was transmitted. If no location signal is present the new scanning value is reconstructed of the three preceding known points.

If a three dimensional predictor is used, transmitter and receiver must be supplemented appropriately with the picture prediction (see supplemental portion added to FIG. 6).

A further embodiment of the present invention will now be described in which the signals are quantized and a change in the quantization is made to reduce irrelevance. In order to produce control values, the signals are here converted and thereafter, in given time intervals, the frequency distribution of the amplitudes of the converted signals is determined. Means for reading out and quantizing relevant scanning values from the signals which have been delayed by the duration of one time interval are controlled with the aid of the control values in such a manner that the scanning values which are considered to be relevant are determined with a given threshold from the signals which have been subjected to a redundance reducing transformation in that the amount by which the threshold is exceeded is determined, and the sample values are quantized according to the threshold level so that the amount of data transmitted in each time interval, which consists of the product of the number of relevant values per time interval and their amplitudes plus address bits, is kept constant.

A variable threshold can keep the number of transmitted values constant with the same quantization. Low detail pictures or parts thereof are transmitted with few signal values and fine quantization. Pictures or parts thereof with a high proportion of detail are transmitted with many signal values and coarse quantization.

The same number of bits is transmitted for each time interval. If not only the threshold but also the quantization is changed, each time interval must be represented by the transmission of a word to identify the selected quantization. These words also serve synchronization purposes.

Figure 8:
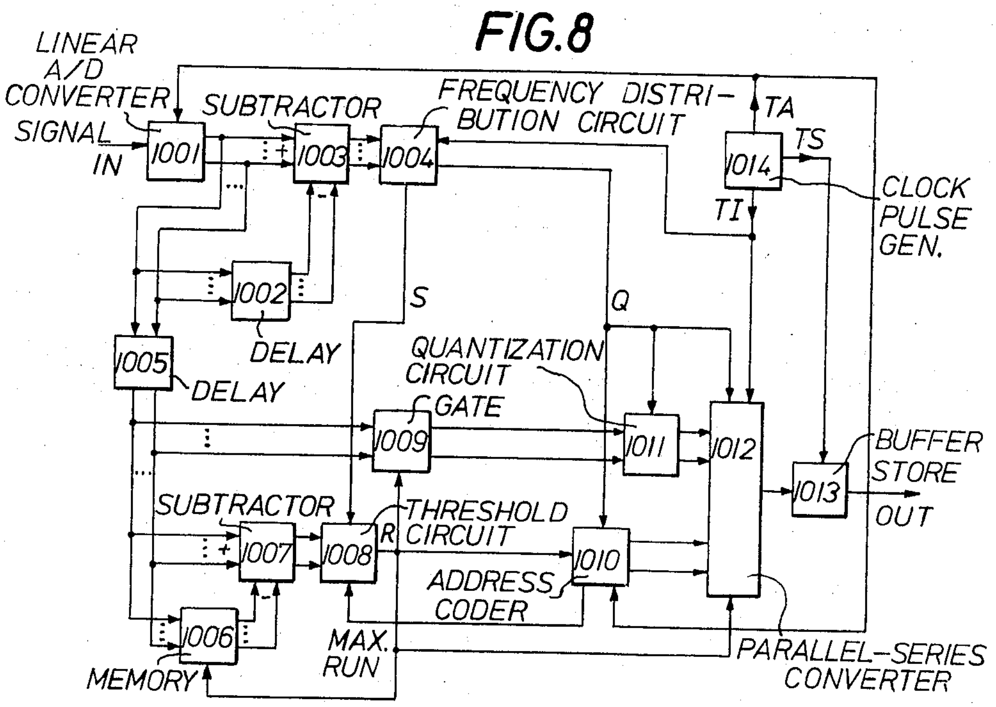
FIG. 8 is a block diagram of the circuit of a further embodiment of the present invention in digital form used to transmit television signals.

The described embodiment is a realization of the invention for the transmission of television signals. FIG. 8 shows the basic circuit as a block circuit diagram. For reasons of simplicity a linear predictor of zero order (ZOP) was selected for purposes of explanation.

The arriving signal is first converted to a digital signal in a linear A/D converter 1001. Of the, for example, five bit planes only two are shown to indicate the parallel binary flow. With a delay 1002 by one sample clock pulse the differnce of consecutive image points is then formed in subtractor 1003. For each fixed time interval there is then determined the frequency distribution in circuit 1004 of the amplitudes of the difference signal and from this the threshold signal S and the quantization signal Q are derived. The quantized input signal is delayed in delay 1005 by the duration of the interval, since a decision about the threshold and quantization applicable for the interval is not available before then, and the difference is formed in subtracter 1007 between the present and the last previously transmitted scanned value. This difference signal is fed to controlled threshold 1008 and, if it is greater than the threshold determined by S, it initiates relevance signal R. Signal R enables gate 1009 and the relevant scanning value goes to buffer store 1013 via the quantization circuit 1011 and the parallel-series converter 1012 which are controlled by quantization signal Q. Signal R also causes its address, which has been produced in the address coder 1010, to be fed into buffer store 1013 via the parallel-series converter 1012. Relevance signal R also acts on the store circuit 1006 for the difference formation which takes over the transmitted relevant vlaue. The buffer store 1013 is read out at the transmitting clock pulse rate which is lower than the sample clock pulse rate by the bandwidth reduction factor. Clock pulses to buffer store 1013, frequency distribution circuit 1004, P/S converter 1012, and linear A/D converter 1001 are supplied from clock pulse generator 1014 with each timing as required.

Figure 9:
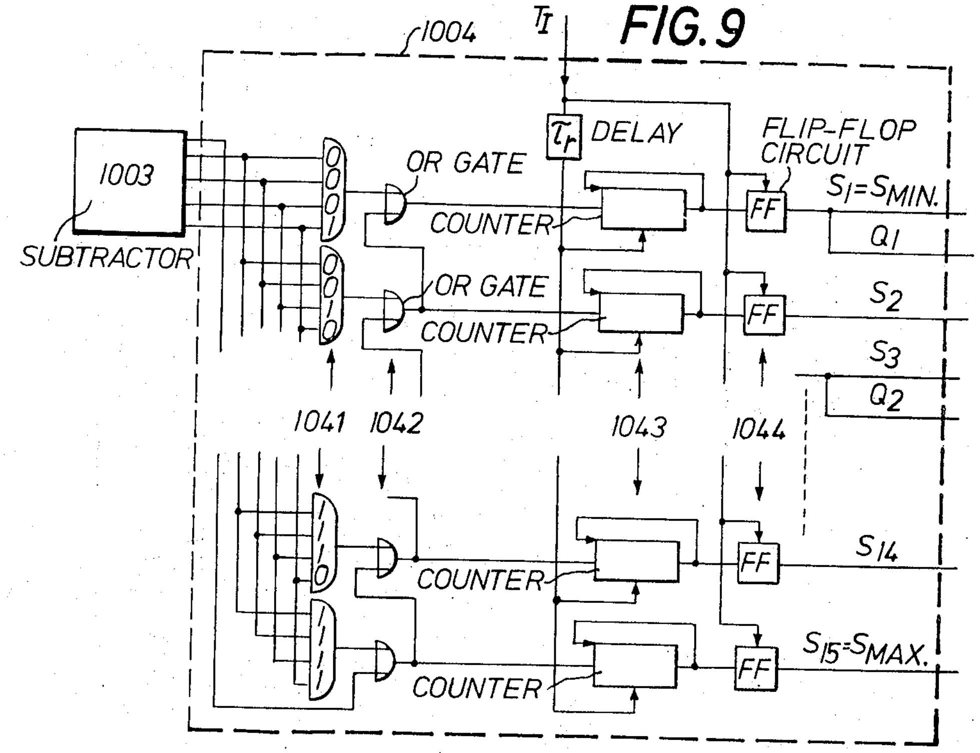
FIG. 9 is a logic block diagram of an embodiment of the frequency distribution circuit portion of FIG. 8.

The individual parts of the circuit of FIG. 8 are will now be explained. The delay by one image point provided by the delay circuit 1002 is effected by flipflops as is the storing of the transmitted relevant value in storage circuit 1006; the delay by one interval in delay 1005 can also be effected by flipflops or by delay times. The circuits 1003 and 1007 for the difference formations may comprise commercially available subtracter circuits. FIG. 9 shows an embodiment of the frequency distribution circuit 1009 for the determination of the frequency distribution of the difference signal from subtracter 1003. With the finest quantization in, for example, 32 amplitude stages it is assumed that the threshold circuit 1008 can take any value within the 16 lower stages.

Only the absolute value of the difference is important. For the 16 lower amplitude stages suitably switched combination circuits 1041 are provided at the input. A chain of OR gates 1042 causes a pulse to be given to each one of the counters 1043 associated with each combination circuit 1041 when the difference signal is greater than the value of the respective combination. Each counter 1043 can count a settable number of pulses during one interval. If only the threshold is changed but not the quantization and address of the relevant signals, this settable amount of pulses is the same for all counters. With a change in the quantization in, for example, 5, 4, 3, bits with the associated address length of 5, 4, and 3 bits, the counter associated to the smallest threshold can count, for example, Z pulses. The counter of the second threshold can then count $1.25 \cdot Z$ pulses (instead of 10 bits per relevant value 8 bits), the counter of the third threshold also counts $1.25 \cdot Z$, the counter of the fourth threshold however counts $1.67 \cdot Z$ (instead of 10 bits per relevant value 6 bits); the same for all other counters.

If a counter 1043 is full, it is stopped and the separating line between the full and the not full counter present at the end of an interval indicates which threshold is the correct one to just fill buffer store 1013 of the circuit (with relevant values of the interval).

This parallel decision is stored by flipflops 1044 for the duration of the next interval and forms the setting criterion S for the variable threshold 1008. The counters are reset to their starting value and the measurement for the new interval begins. The delay $\tau_r$ causes the counters to be reset only when the associated flipflops 1044 have taken over the decision. The decision of which quantization Q to select is also available at the counter outputs. If no counter is full, quantization is made in five bits; if one counter is full, in four bits; if another counter is full, in three bits. The address is accordingly switched to shorter words.

Figure 10:
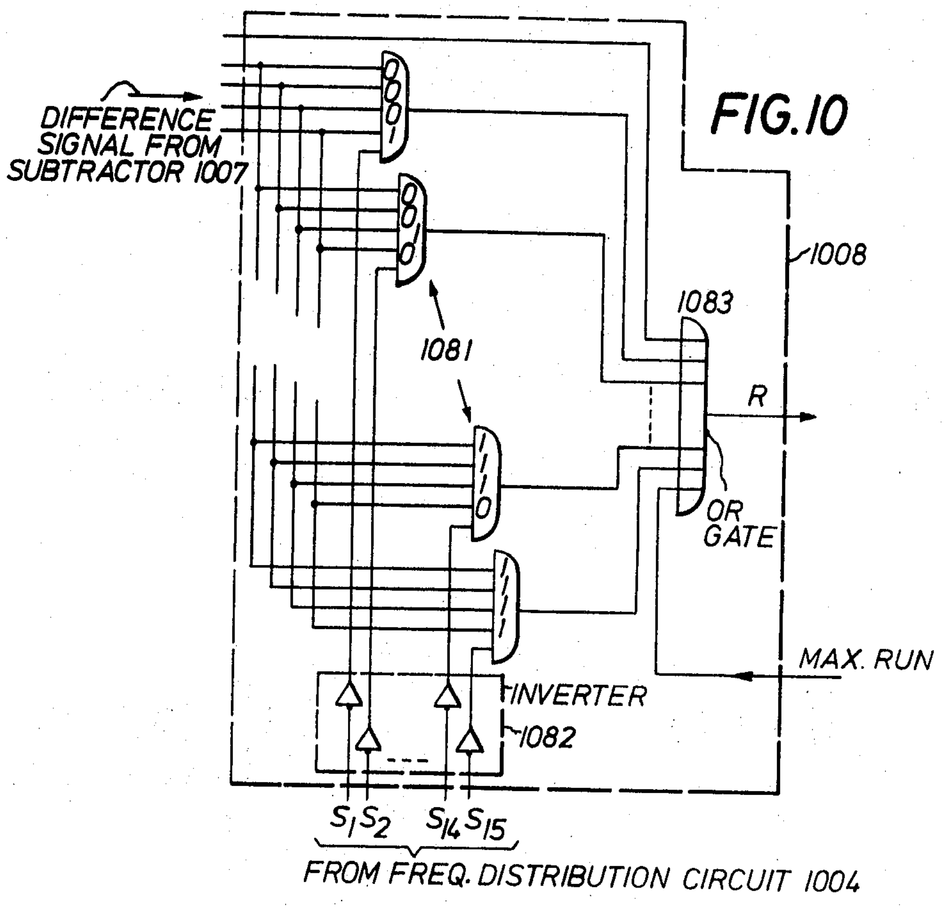
FIG. 10 is a detail circuit diagram of the threshold circuit of FIG. 8.

The variable threshold 1008 is explained with the aid of FIG. 10. The arriving difference signal can take up values from three regions:

a. it is smaller than the set threshold $S_n$;

b. it is larger than the set threshold $S_n$ but smaller than the maximum threshold;

c. it is larger than the maximum threshold.

The threshold is set by the outputs of frequency distribution circuit 1004 applied to $S_1 - S_{15}$. As there, suitably switched combining circuits 1081 are provided at the input for the 16 lower amplitude stages with an additional input for setting the threshold. At these inputs a 0 is present for $-S<S_n$, a 1 for $S \geq S_n$, which is accomplished by inverter 1082. If case (a) occurs, no pulse is given to the final OR gate 1083, the value is not transmitted.

In case (b) a pulse reaches OR gate 1083 via one of the suitably connected combining circuits 1081 and in case (c) directly.

The signal value at gate 1009 is transmitted and thus written into the memory 1006 for the difference formation. The additional input of the OR gate which is called "max. Run" then effects that an actually redundant value is transmitted when a maximum distance from the last transmitted value given by address coder 1010 has been reached and a new run begins.

Figure 11:
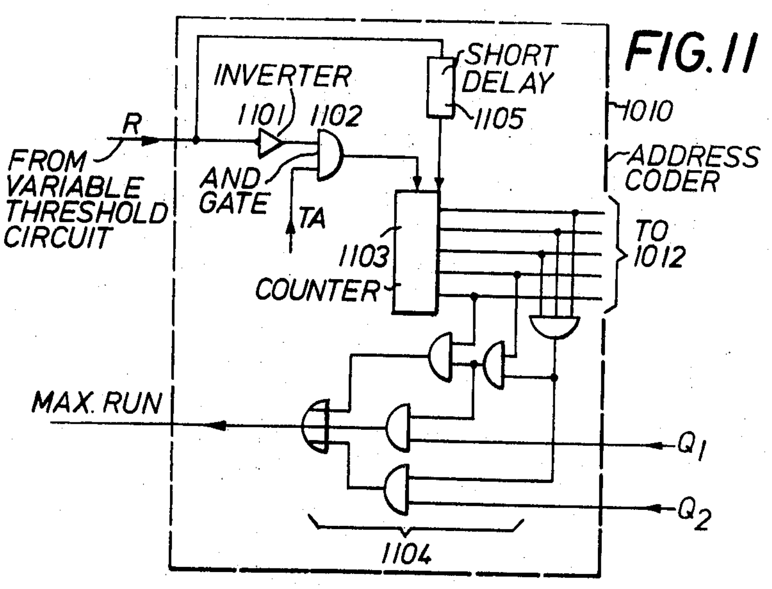
FIG. 11 is a detail block logic circuit diagram of the address coder of FIG. 8.

The address coding of address coder 1010 shown in FIG. 11 is based on a count of the sample clock pulses between nonrelevant sample values.

The pulse train R available at the output the variable threshold circuit 1008 is inverted by invertor 1101 and sampled by means of an AND gate 1102. Counter 1103 counts until, after a succession of nonrelevant sample values, a relevant sample value is present. The count indicating the distance from the last relevant value is then read into the buffer store 1013 via the P/S converter 1012 and counter 1103 is then set to zero via a short delay 1105. Signal Q limits the, e.g. maximum zero sequence by means of gate group 1104 to 31 ($Q_1 = Q_2 = 0$), 15 ($Q_1 = 1$, $Q_2 = 0$) or 7 ($Q_1 - Q_2 = 1$). If the maximum zero sequence has been reached a pulse (max. Run) is given to the OR gate 1083 of the variable threshold circuit 1008 and a new run begins since an actually nonrelevant value is being transmitted.

Gate 1009 may be realized in a known manner by AND gates which are enabled by the relevance signal R. The quantization circuit 1011 is also very simple since it does or does not block bit planes in dependence on the quantization signals $Q_1$ and $Q_2$ by means of AND gates.

The parallel-series converter 1012 converts 5, 4, or 3 parallel amplitudes and address bits into a series word when a relevance signal is present, depending on the state of the quantization signals $Q_1$ and $Q_2$, the series word being read into buffer store 1013. It also inserts, at the beginning of each interval, a suitably selected word into the binary flow which helps the receiver recognize the selected quantization (and thus word length) and serves as synchronization.

Buffer store 1013 which can hold the fixed quantity of the signal and address bits produced with variable spacing may be realized in such a manner that for example a first shift register is filled during the duration of one interval, while a second shift register is read out with the transmitting clock pulse. In the next interval the roles of shift registers 1001 and 1002 are exchanged.

This concludes the description of the exemplary realization of the method of the present invention.

Figure 12:
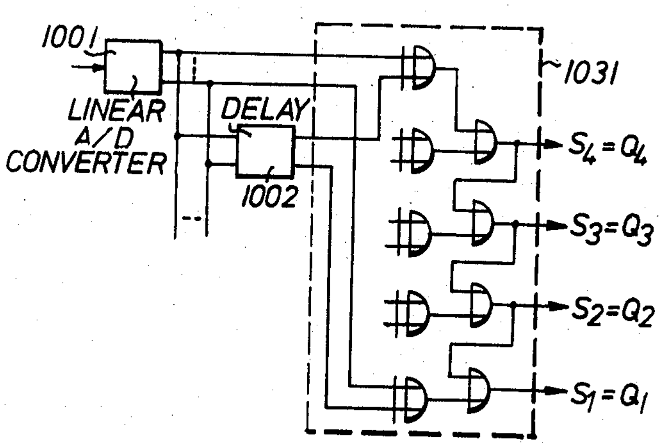
FIG. 12 is a block logic circuit diagram of a modification of the circuit of FIG. 9 in conjunction with FIG. 8.
Figure 13:
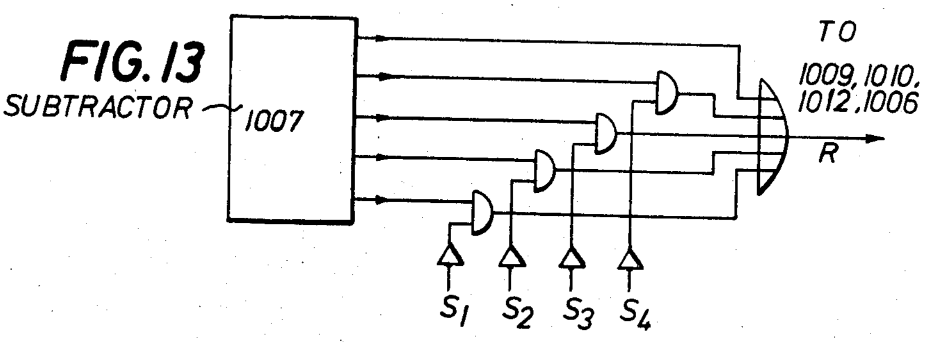
FIG. 13 is a block logic diagram of a variation of the circuit of FIG. 10 when the circuit of FIG. 12 is used.

It is not always necessary to change the threshold linearly. When it is appropriate, for example, to use a threshold which is staggered to correspond to the bit planes, substantial simplifications result. No complete difference formation is necessary for the determination of the frequency distribution from a circuit 1004. For example, a simple coincidence test between consecutive scanning values by exclusive-OR gate 1031 is sufficient, as shown in FIG. 12, in the various bit planes. The variable threshold circuit 1008 is also simplified as shown in FIG. 13 in that the suitably connected combination circuits can also be eliminated, and gates are only provided which initiate an output pulse depending on the result of the threshold determination, only when the difference is so great that it changes a bit in the switched-through bit planes. The quantization signals are identical with the threshold signals in this type of threshold staggering.

A further improvement of the proposed system results from a change in the address code.

The previously employed solution of indicating the address of a relevant scanning value by its distance from the last relevant scanning value has the drawback that, if one address was falsified due to interference in the transmission channel all sample values following this address in the line will appear in the wrong place.

The possibility exists of limiting this error to the duration of one time interval within which the fixed amount of data is being transmitted.

For this purpose the address of a sample value is identified by its distance from the last relevant sample value only within the time interval, while the first relevant value in the time interval has as its address the distance from the interval limit.

Due to the constant number of bits per time interval the interval limits can easily be synchronized with known means without any additional information being required.

Figure 14:
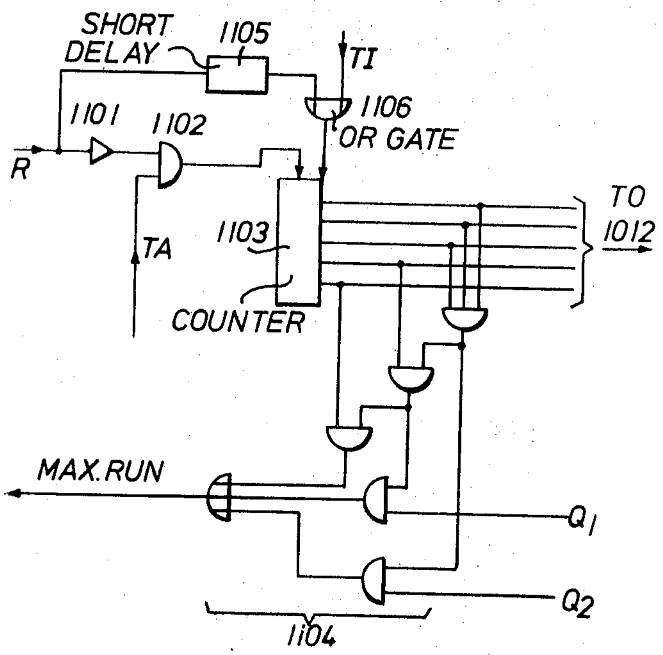
FIG. 14 is a block circuit diagram for an address coder of FIG. 8 which is a variation of that shown in FIG. 11.

FIG. 14 shows a circuit for this address coding. Except for OR gate 1106 is corresponds to the circuit of FIG. 11 and operates in the same manner. The OR gate 1106 causes counter 1103 to be set to zero at the beginning of a new interval by interval clock pulse TI.

A description of the receiver is not necessary since it is constructed reciprocally to the transmitter and does not offer any circuitry problems.

It is also possible, according to the present invention, to transmit the location and amplitude values no longer in a fixed sequence as identical characters, but to represent, for example, the amplitude values by positive pulses and the location values by negative pulses or, in digital representation, to select digital words for the location and amplitude values which differ from one another at a certain point.

With such measures, the bandwidth reduction factor is increased at the expense of the signal to noise ratio (6 db), since now, when a plurality of relevant amplitude values follow one another, a location signal need be transmitted only for the first amplitude value.

If the transmission channel does not have the required signal to noise ratio, the location values can be split into two values to be transmitted to protect the signal transmission.

It will be understood that the above description of the present invention is susceptible to various modifications, changes and adaptations, and the same are intended to be comprehended within the meaning and range of equivalents of the appended claims.

We claim:

1. A method for reducing data signals, particularly picture signals, for adaptation to the limited capacity of a transmission channel, comprising the steps of:

forming a transformed signal of the input data signals by forming the differences between adjacent scanning values of the input data signals;

determining the frequency distribution of the amplitudes of the transformed signal in a given time interval, by detecting the frequency with which the amplitudes of the transformed signal exceed individual thresholds within said time interval;

forming a control signal whose value depends on the determined frequency distribution;

delaying the input data signals for the duration of said time interval;

forming a predicted value signal for the scanning values of the delayed input data signal;

selecting the relevant scanning values out of the delayed input data signal by comparing said control signal with the difference between the scanning values of the delayed input data signal and the respective predicted values and producing an output signal to gate the delayed input data signal whenever the control value is exceeded;

counting nonrelevant successive scanning values to provide the location signals for the relevant scanning values; and feeding the relevant scanning values and the location signals to at least one buffer store, from where they are transmitted to the transmission channel in equidistance sequences.

2. The method as defined in claim 1 wherein the location signals and the data signals are transmitted with different polarities and wherein location signals are transmitted only for those relevant signals which are not immediately consecutive.

3. The method as defined in claim 1 wherein the location signals are split up into more than one individual signal.

4. The method as defined in claim 1 further comprising:

transmitting a data signal after a predetermined maximum time independent of whether or not the data signal is considered to be relevant.

5. The method as defined in claim 1 wherein location signals within a time interval determine the distances in time with respect to a given time raster, the spacing of the raster lines being greater or equal to the maximum set run length of the transmitted signal.

6. A method for reducing digital data signals, particularly quantized picture signals, which are in a digital form, for adaptation to the limited capacity of a transmission channel, comprising the steps of:

comparing adjacent sample values of the input data signals to provide comparison signals;

determining the frequency distribution of the amplitudes of the comparison signals in a given time interval, by means of counters for individual thresholds, by counting sample clock pulses during the time during which the comparison signal exceeds the respective thresholds;

deriving control signals from the determined frequency distribution to control the selection and the quantization of relevant sample values;

delaying the input sample values by said given time interval;

selecting the relevant sample values from the input data signals by forming the difference between the delayed input sample values and a predicted value which is stored in a memory, comparing this difference value to a threshold value set by said control signals, and initiating a relevance signal to gate the delayed input sample values whenever the threshold value is exceeded;

counting the nonrelevant successive sample values to provide location signals for the relevant values with the count constituting the code word for the address when a relevant sample value is present;

quantizing the relevant sample values;

feeding the quantized relative simple values and the code words for the address to at least one buffer store for transmission to a transmission channel; and controlling the quantization of the relevant sample values and the maximum sequence of nonrelevant sample values counted so that the quantity of data bits transmitted during each transmission time interval remains constant.

7. The method defined in claim 6 wherein said step of comparing comprises forming the difference between consecutive sample values of the input data signals.

8. The method as defined in claim 6 wherein the thresholds are staggered in powers of base 2; and wherein the step of comparing adjacent sample values comprises testing adjacent sample values for coincidence by means of exclusive-OR gates for the different bit planes of the sample values.

9. The method as defined in claim 6 wherein the relevant scanning values and the code words for their addresses are supplemented by an additional identification bit and wherein the code words for the addresses are transmitted only for relevant scanning values which are not immediately consecutive.

10. The method as defined in claim 6 wherein the address coding is effected, within the time interval, by indicating the distance of a relevant sample value from the last relevant sample value, and giving each first relevant sample value in the time interval as its address the distance from the fixed interval limit.

* * * * *